US009024736B2

(12) United States Patent
Righetto

(10) Patent No.: US 9,024,736 B2
(45) Date of Patent: May 5, 2015

(54) ELECTRO-PNEUMATIC SOUND ALARM

(75) Inventor: Daniele Righetto, Montecchio Maggiore (IT)

(73) Assignee: Fisa Italia S.R.L., Montecchio Maggiore (IT)

( * ) Notice: Subject to any disclaimer, the term of this patent is extended or adjusted under 35 U.S.C. 154(b) by 184 days.

(21) Appl. No.: 13/540,772

(22) Filed: Jul. 3, 2012

(65) Prior Publication Data

US 2014/0009272 A1 Jan. 9, 2014

(51) Int. Cl.
*G08B 3/00* (2006.01)
*G10K 9/22* (2006.01)
*B60Q 5/00* (2006.01)

(52) U.S. Cl.
CPC ... *G10K 9/22* (2013.01); *B60Q 5/00* (2013.01)

(58) Field of Classification Search
USPC ........ 340/388.1–388.6, 390.1, 404.1, 815.72; 116/137 R, 138, 139, 142 R; 381/111, 381/112; 181/148, 152, 153
See application file for complete search history.

(56) References Cited

U.S. PATENT DOCUMENTS

| | | | | |
|---|---|---|---|---|
| 3,846,792 A | * | 11/1974 | Haigh | 340/384.73 |
| 4,007,703 A | * | 2/1977 | Frigo | 116/142 FP |
| 5,835,068 A | * | 11/1998 | Paul et al. | 343/757 |
| 6,796,255 B2 | * | 9/2004 | Ogi et al. | 112/258 |
| 6,796,265 B1 | * | 9/2004 | Dexter et al. | 116/137 R |
| 7,038,576 B2 | * | 5/2006 | Di Giovanni et al. | 340/404.1 |
| 7,938,078 B2 | * | 5/2011 | Solow | 116/142 FP |
| 2008/0123894 A1 | * | 5/2008 | Lu | 381/394 |

FOREIGN PATENT DOCUMENTS

| | | |
|---|---|---|
| WO | WO 98/52170 A1 | 11/1998 |
| WO | WO 03/056545 A1 | 7/2003 |
| WO | WO 2009/032442 A1 | 3/2009 |

OTHER PUBLICATIONS

EPO Search Report.

* cited by examiner

*Primary Examiner* — George Bugg
*Assistant Examiner* — Edny Labbees
(74) *Attorney, Agent, or Firm* — Bucknam and Archer

(57) ABSTRACT

Herein described is an electro-pneumatic sound alarm, to be fitted on a two or four wheeled vehicle, constituted by an electro-compressor (2), having the function of drawing atmospheric air, compressing it and conveying it to an acoustic group (3). Such sound alarm (1) is characterized in that the electro-compressor (2) and the acoustic group (3) are mutually held by means of removable fit-coupling; furthermore, the coupling elements are rigid and integral with the aforementioned two components (FIG. 1).

3 Claims, 7 Drawing Sheets

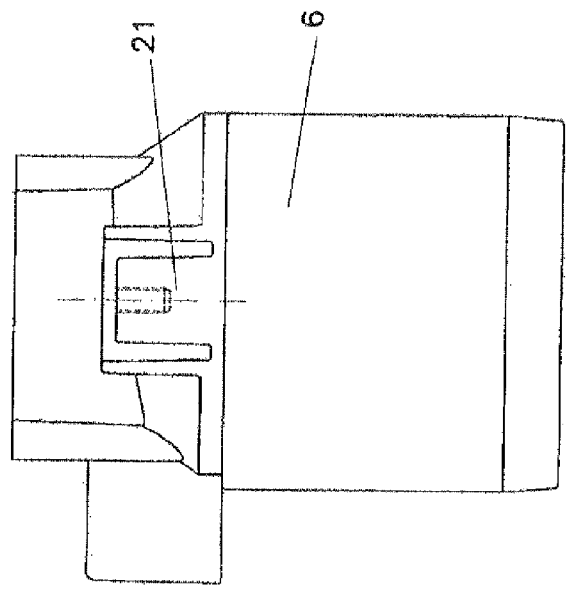
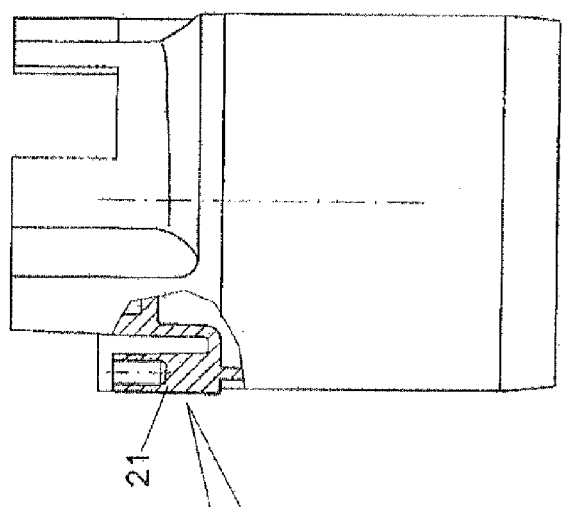
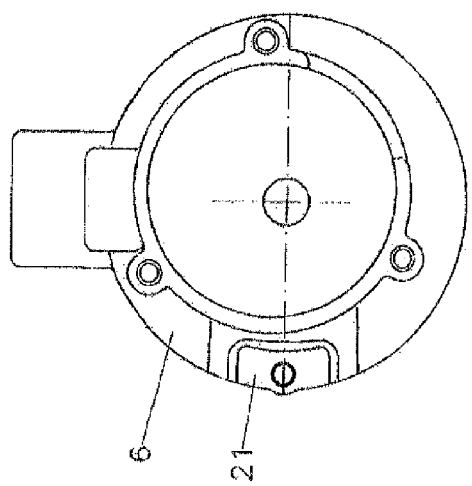
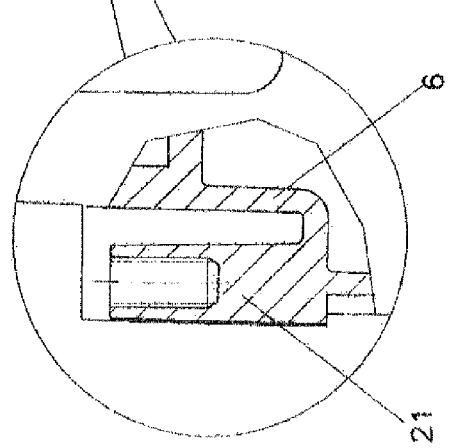
FIG. 7
FIG. 6
FIG. 5

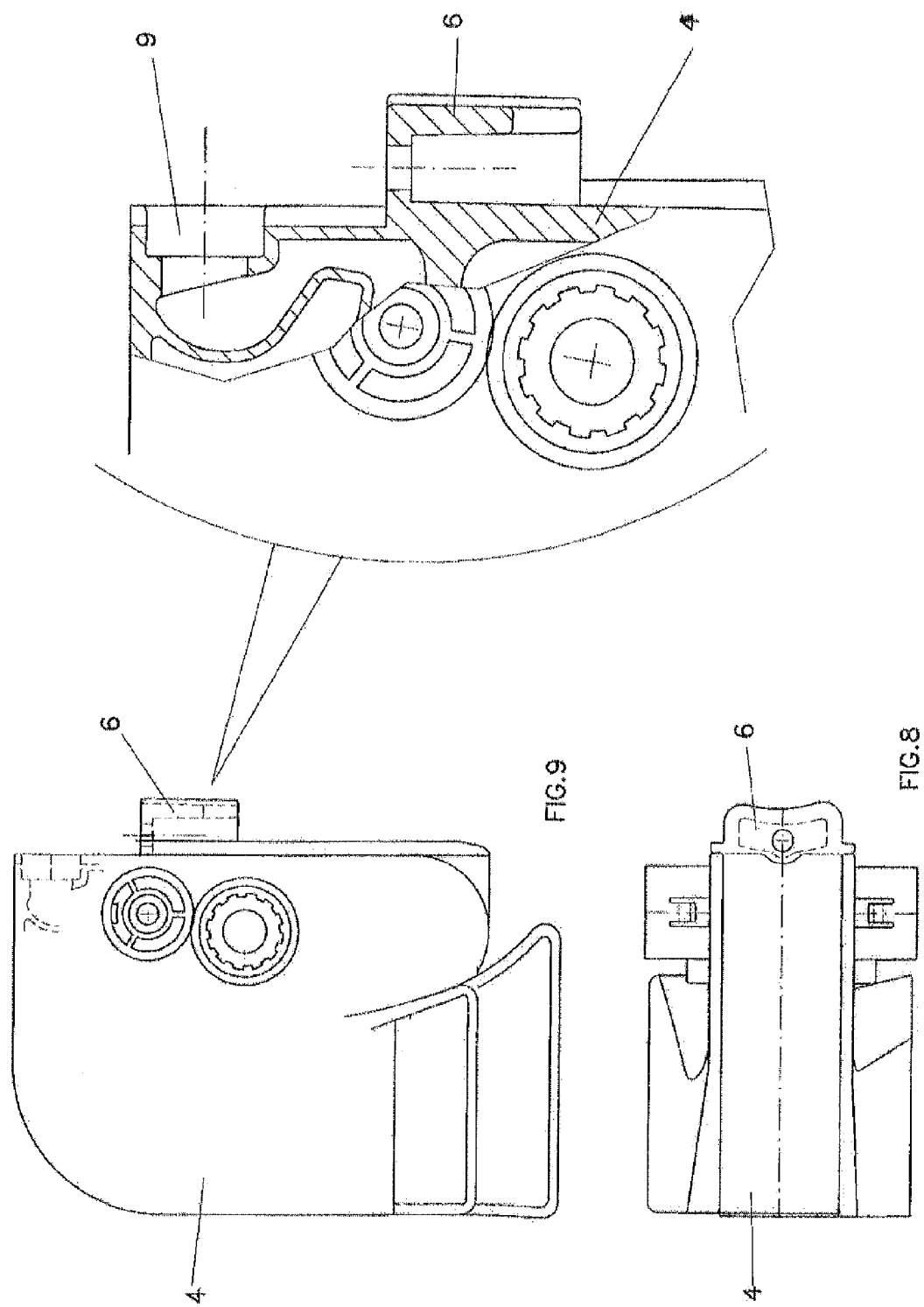

ELECTRO-PNEUMATIC SOUND ALARM

The present invention regards an electro-pneumatic sound alarm according to the introduction part of claim 1.

The electro-acoustic sound alarms, to be fitted on two or four-wheel vehicles, are substantially constituted by an electro-compressor and by an acoustic group.

In a common embodiment the electro-compressor, of the type with radiant vanes inserted into an eccentric compression chamber, has the function of drawing the environmental air, compressing it and conveying it to the acoustic group.

Such acoustic group comprises a central body, generally made of thermoplastic material, which has—therein—two exponential separate labyrinth-shaped conduits, arranged mutually opposite and closed laterally by two covers which follow the external shape of the central body, covering the path of the labyrinth conduit and completing the final part of said body, generically defined as trumpet, with two exponential curve-shaped ports in atmospheric communication with the atmosphere, from which there are simultaneously emitted two sounds with different frequencies.

The acoustic group is completed with two acoustic chambers, mutually positioned opposite on the two sides of the trumpet and placed in communication with the end part of the two acoustic conduits.

Operatively, the pressurised air produced by the compressor, passing through an air intake arranged on the cover which closes the compression chamber flows directly into a chamber located in the central part of the trumpet where it is distributed into two flows which end up impacting and oscillating the membrane of the two acoustic chambers hence displacing the air within the two respective acoustic conduits and thus producing the two-tone sound typical of the horn (by way of example: the long 660 Hz horn and the short 530 Hz horn, sound level between 106-118 db (A) 2 m away.

Currently, there are known numerous types of electro-pneumatic sound alarms which reveal drawbacks depending on the complexity of the provision thereof and on the overall dimensions.

By way of example, reference shall be made to the electro-pneumatic sound alarm described in the patent document no V12001A000270 in which the connection between the acoustic group and the electro-compressor is obtained through a collar which, projecting from the body of the acoustic group is coupled—after elastic deformation—on the body of the electro-compressor.

Such embodiment has the advantage of simplifying the mutual coupling system between the two components, precisely the acoustic and electro-compressor group, but it reveals two practical drawbacks.

The first drawback is of the construction type, given that there is required the provision of a mould that is considerably complex and having considerable dimensions, which comprises—besides the entire acoustic body—also the neck projecting from said body.

The second drawback is of the operative type and it depends on the fact that the collar, having to be an elastically deformable element, does not allow a safe coupling and—in addition—in case of impacts or other inadvertent stresses it may be deformed up to breakage and thus be detached from the two parts due to the separate two-branched annular shape thereof.

An object of the present invention is that of providing an electro-pneumatic sound alarm free of the drawbacks revealed by the similar products of the known type.

Specifically, an object of the invention is that of providing an electro-pneumatic sound alarm that is simple to provide, easy and quick to install on the vehicle, as well as compact and having a minimum overall dimension, to adapt it to the narrow spaces made available in motorcycles and motor vehicles; the entirety should lead to an inherently inexpensive production.

This object is obtained by providing an electro-pneumatic sound alarm, which is characterised in that the two components subject of the invention, precisely the electro-compressor and the acoustic group, are mutually held by means of a removable mortise and tenon type of fit-coupling, with the two coupling elements being rigid and integral with the aforementioned two components.

Still said objects are attained by providing a sound alarm, further characterised in that the two acoustic chambers are held on the central body, which constitutes the trumpet of the device through a removable snap-coupling of the so-called clip type, where a flexible tab protruding from one of the two components gets deformed to fit into a corresponding seat obtained on the other component of the device.

The invention will be defined more in detail through the description of a possible embodiment thereof, provided by way of non-limiting example, with reference to the attached, wherein:

FIGS. 5-7 represent three orthogonal views of the electro-compressor;

FIGS. 8-9 represent two orthogonal views of the trumpet;

Figure 10:
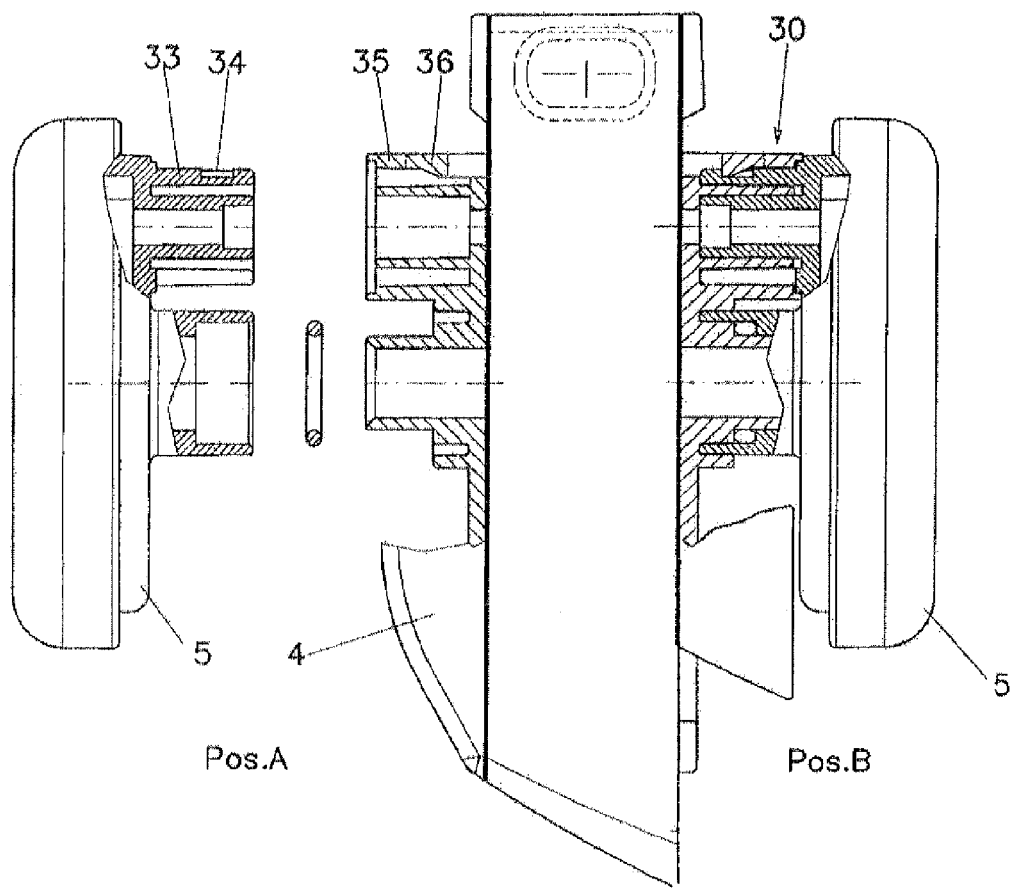
Figure 11:
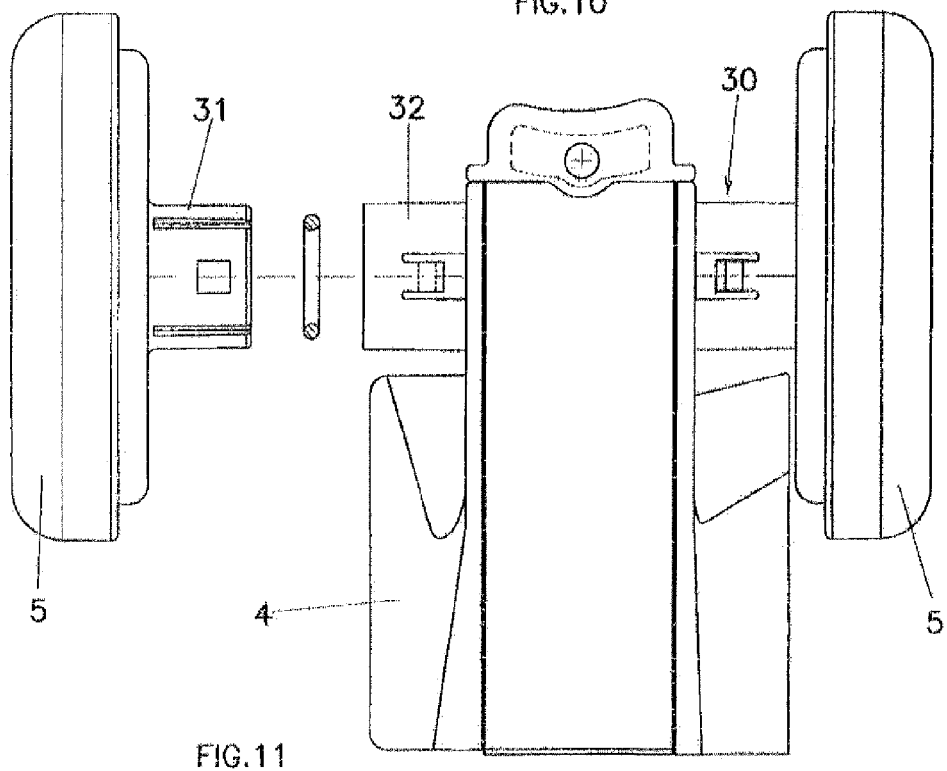

FIGS. 10-11 respectively represent two elevational front and plan views of the acoustic group, in the two conditions in which the acoustic chambers are separated from the trumpet and with the acoustic chambers applied on the trumpet.

Figure 1:
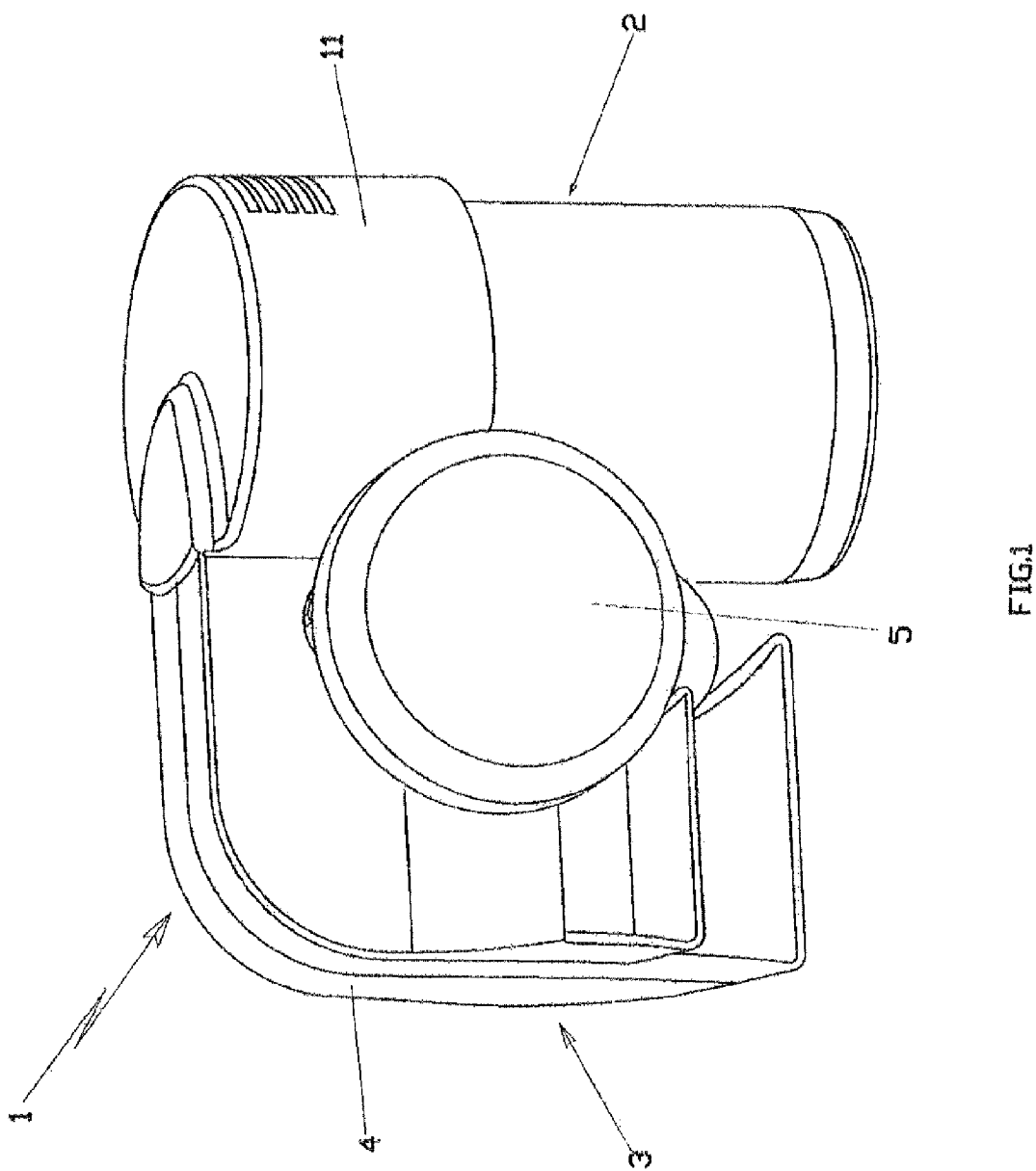
FIG. 1 represents an assembly view of the sound alarm according to the invention.

As observable in FIG. 1, the electro-pneumatic sound alarm—indicated in its entirety with reference 1—is made up of an electro-compressor 2 and an acoustic group—indicated in its entirety with reference 3—is in turn made up of a central body or trumpet 4, and by two side acoustic chambers.

Figure 2:
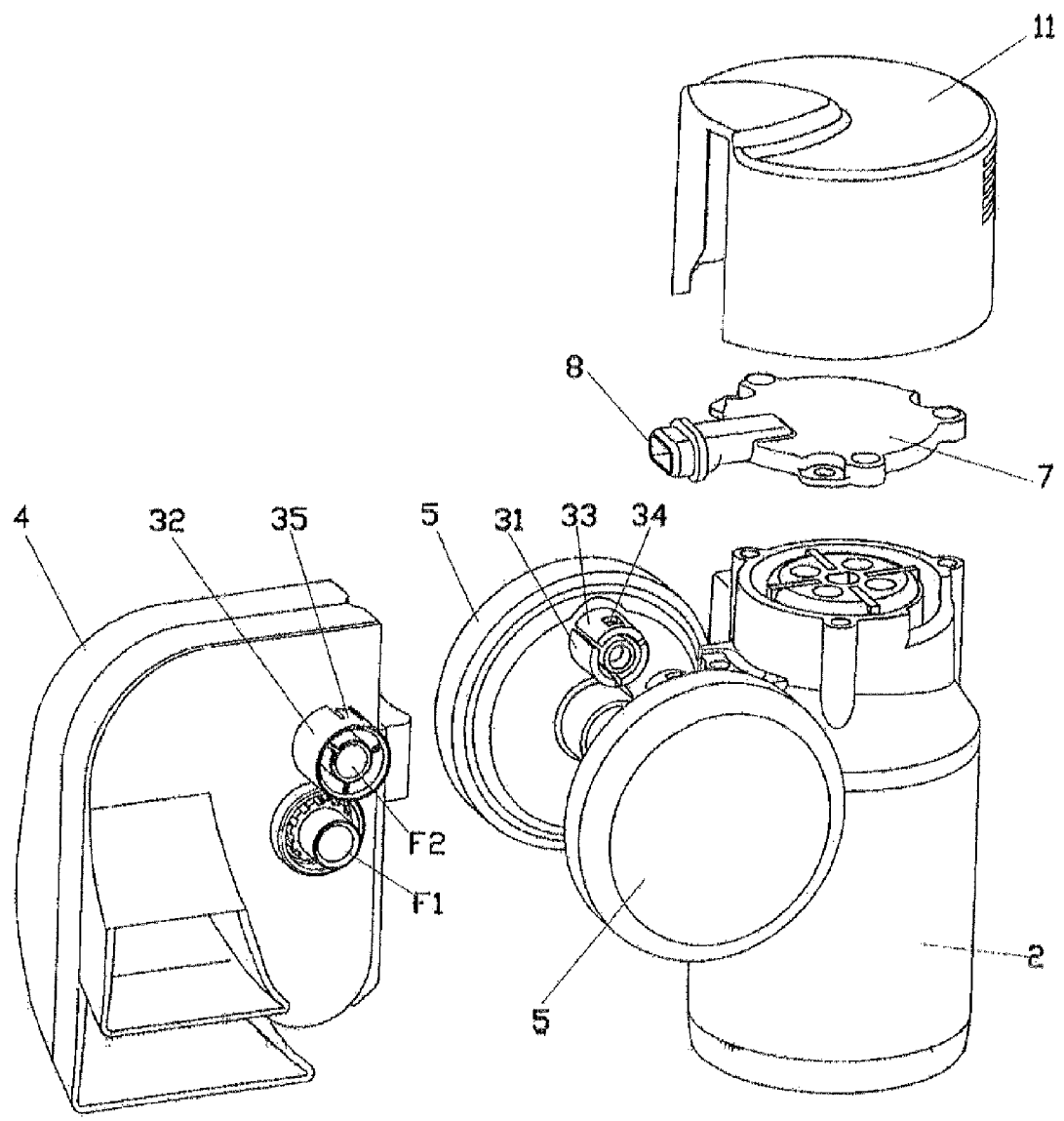
FIGS. 2-3 represent two different exploded perspective views of the alarm according to FIG. 1.
Figure 3:
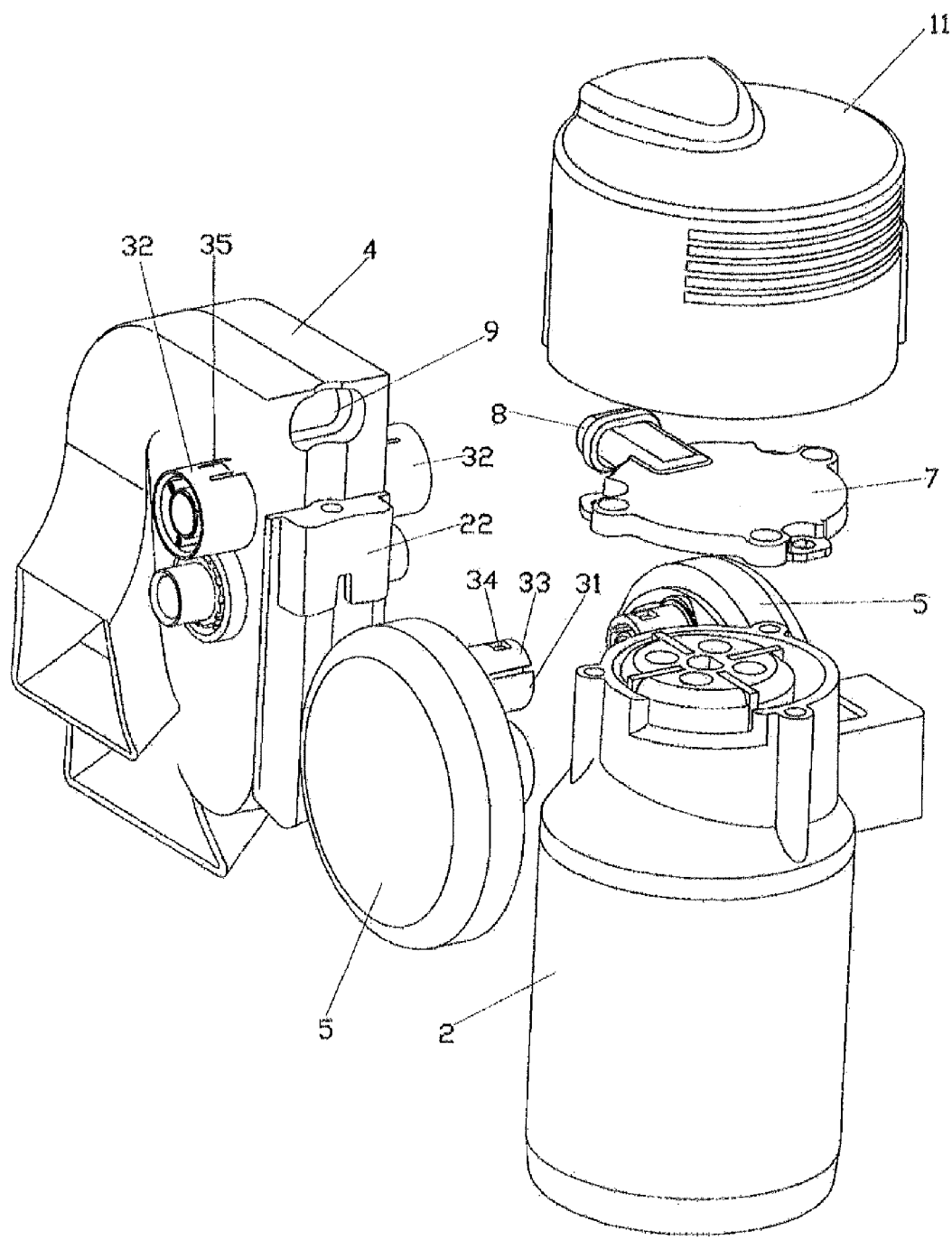
Figure 4:
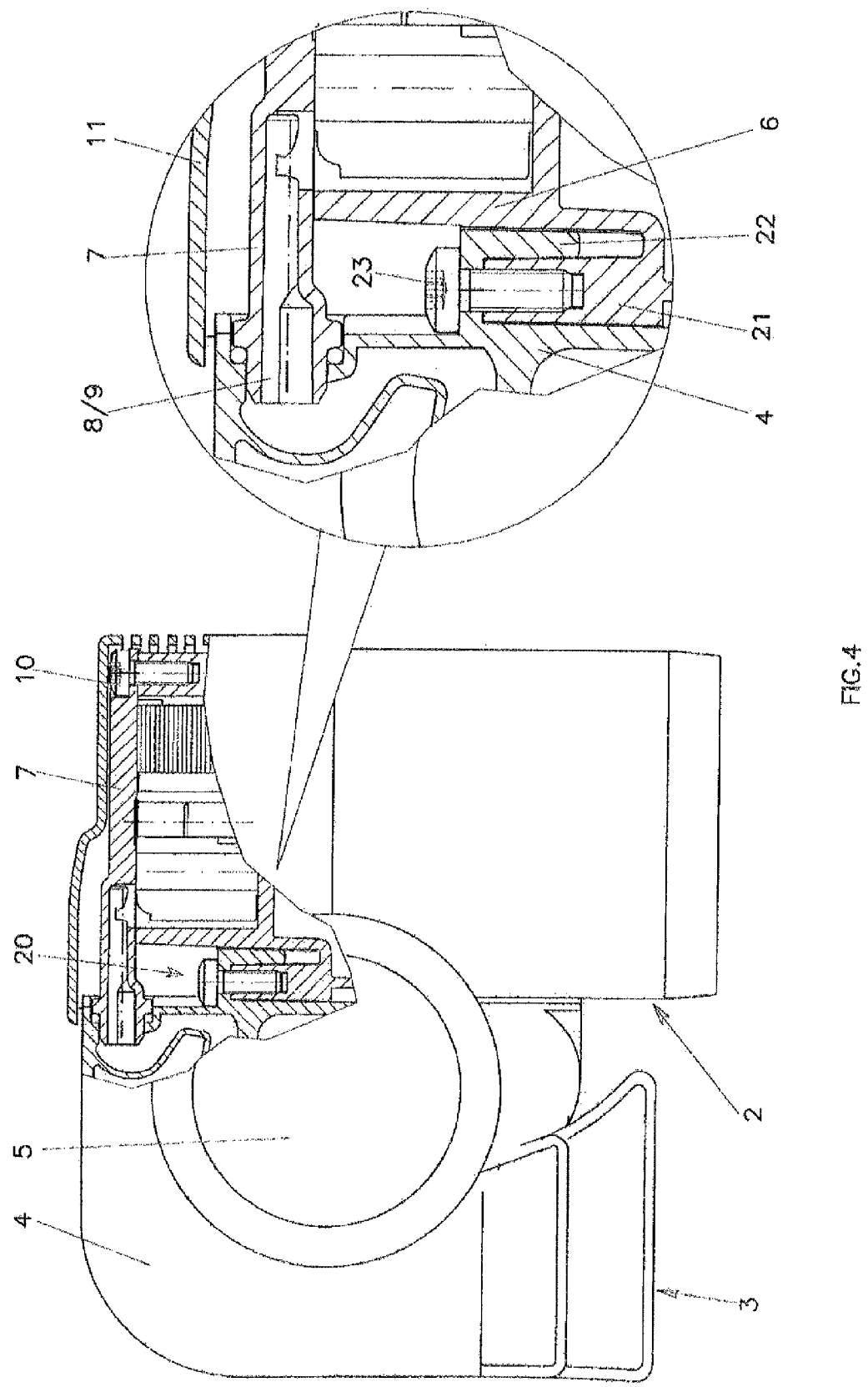
FIG. 4 represents a front elevational and partly sectioned view of the sound alarm according to FIG. 1.

As observable in FIGS. 2-4, the electro-compressor 2 is constituted by a body 6, which contains the electric motor and the compression eccentric chamber with four radiant vanes, closed—at the upper part—by a cover 7, in form of a plate and provided with a mouthpiece with horizontal axis 8 which fits into the corresponding cavity 9 of the trumpet 4 for delivering the air flow under pressure to the two acoustic chambers 5; said cover is held on the aforementioned body through mechanical coupling means or through the screws 10; the entirety is closed by a protection cap 11.

As observable in FIGS. 1-9, the electro-compressor 2 and the acoustic group 3 are mutually retained to form the compact body 1 through coupling means—indicated in their entirety with reference 20—constituted by a mechanical coupling with rigid elements of the mortise and tenon type, where the male element or tenon 21 is obtained on the casing of the body 6 of the motor while the female element or mortise 22 is obtained with an appendage projecting from the body of the trumpet 4.

The coupling 20 is held blocked using the screw 23.

As observable in FIGS. 2-3 and 10-11, the two acoustic chambers 5 are applied on the two opposite sides of the trumpet 4, at the two conduits F1 and F2 of the airflow which travels the internal channels of the trumpet.

The two acoustic chambers 5 are removably held on the trumpet through a snap or clip coupling—indicated in their entirety with reference 30—provided on the two hubs 31 and 32 respectively projecting from the acoustic chamber and from the trumpet.

In detail, as observable in FIG. 10 (Pos A) in the hub 31 there is obtained a flexible tab 33, provided with a recess 34, while in the opposite hub 32 there is obtained a corresponding tab 35, provided with an internal tooth 36. As observable in FIG. 10 (Pos 2) when the acoustic chamber 5 is applied on the trumpet 4, the flexible tab 33 is coupled—by flexion—with the tab 35; thus, there occurs the fitting of the tooth 36 in the recess 34, to obtain the desired coupling.

An electro-pneumatic acoustic alarm thus structured allows having:
- a device that is very compact and small in size;
- a device that is easy to obtain and quick to assemble, being constituted by elements that are mutually removable, replaceable and connected through quick couplings.

The invention thus conceived can be subjected to numerous variants and the details thereof can be replaced by technically equivalent elements as long as they fall within the scope of the inventive concept outlined in the claims that follow.

The invention claimed is:

1. An electro-pneumatic sound alarm adapted to be fitted on two- or four-wheeled vehicles, said sound alarm including an electro-compressor (2), having the function of drawing ambient air, compressing it and delivering it to an acoustic group (3), said acoustic group comprising a central body (4), made of a thermoplastic material, which includes two separate exponentially shaped acoustic conduits in the form of a labyrinth, arranged reciprocally opposite each other and laterally closed by two covers, which follow the outer shape of the central body, covering the path of the labyrinth conduit and which complete the end portion of said central body, defined by the general term of trumpet, with two exponentially shaped outlets in communication with the atmosphere, wherefrom two sounds are concurrently emitted each at a different frequency, said acoustic group (3) further including two acoustic chambers (5), positioned reciprocally opposite on the two sides of the trumpet (4) and placed in communication with an outer end portion (F1, F2) of the two acoustic conduits, said electro-compressor (2) and said acoustic group (3) being mutually retained by a removable joint-wise coupling (20) wherein the coupling elements are rigid and integral to the electro-compressor and the acoustic group and wherein the coupling (20) that mutually retains the electro-compressor (2) and the acoustic group (3) comprises a mechanical joint of the tenon and mortise type wherein the electro-compressor (2) includes a body (6) and the coupling (20) comprises a male element (21) formed on said body (6) of said electro-compressor (2) and a female counter element (22) formed as an appendix protruding from the central body (4) of the acoustic group (3), the male element (21) and female counter element (22) being fastened together by a screw (32) and wherein the two acoustic chambers (5) are retained on the central body or trumpet (4) by a removable snap-wise clip-type coupling (30), wherein a flexible tab, protruding from one of the acoustic chambers and the central body is adapted to be deformed to fit into a corresponding seat, obtained on the other of the acoustic chambers and the central body.

2. The electro-pneumatic sound alarm according to claim 1, wherein the body (6) of the electro-compressor (2) contains an electrical motor and an eccentric compression chamber with four radiant vanes, wherein the electro-compressor (2) is closed at the top by a cover (7), shaped as a plate and provided with a mouthpiece with horizontal axis (8) adapted to fit into a corresponding cavity (9) of the trumpet (4), for delivering air under pressure to the two acoustic chambers (5).

3. The electro-pneumatic sound alarm according to claim 1, wherein the snap-wise coupling (30) that retains the two acoustic chambers (5) on the trumpet (4) is obtained on a female hub (31) and a male hub (32) respectively protruding from one of acoustic chambers (5) and trumpet (4), wherein a flexible tab (33) is obtained in the hub (31), provided with a lowering (34) whereas a corresponding tab (35) is obtained in the opposite hub (32), provided with a tooth (36), so that when female hub (31) of acoustic chamber (5) is applied to male hub (32) on the trumpet (4), the flexible tab (33) hooks by bending with the tab (35), for obtaining the joint of the tooth (36) into the lowering (34).

\* \* \* \* \*